(12) United States Patent
Poulos et al.

(10) Patent No.: US 10,576,857 B2
(45) Date of Patent: Mar. 3, 2020

(54) SEAT BACK FRAME

(71) Applicant: Adient Luxembourg Holding S.á r.l., Luxembourg (LU)

(72) Inventors: Yannis Poulos, Sylvania, OH (US); Raghuraj S. Tathe, Pimpri (IN); Ana A. Munte, Livonia, MI (US); Roger L. Meyerink, South Lyon, MI (US); Edward J. Lamont, Livonia, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/076,890

(22) PCT Filed: Feb. 2, 2017

(86) PCT No.: PCT/US2017/016170
§ 371 (c)(1),
(2) Date: Aug. 9, 2018

(87) PCT Pub. No.: WO2017/139165
PCT Pub. Date: Aug. 17, 2017

(65) Prior Publication Data
US 2019/0061579 A1 Feb. 28, 2019

Related U.S. Application Data

(60) Provisional application No. 62/294,494, filed on Feb. 12, 2016.

(51) Int. Cl.
*B60N 2/20* (2006.01)
*B60N 2/22* (2006.01)
(Continued)

(52) U.S. Cl.
CPC ............... *B60N 2/682* (2013.01); *B60N 2/20* (2013.01); *B60N 2/22* (2013.01); *B60N 2/2893* (2013.01); *B60N 2/68* (2013.01); *B60N 2/688* (2013.01)

(58) Field of Classification Search
CPC .......... B60N 2/20; B60N 2/22; B60N 2/2893; B60N 2/68; B60N 2/682; B60N 2/688
(Continued)

(56) References Cited

U.S. PATENT DOCUMENTS 1,729,041 A 9/1929 Harman
3,185,525 A 5/1965 Welsh
(Continued)

FOREIGN PATENT DOCUMENTS

DE 102006036915 A1 2/2008
EP 2546098 A1 1/2013
(Continued)

OTHER PUBLICATIONS

European Patent Office, Extended European Search Report issued in Application EP17750589.8, dated Oct. 28, 2019, 8 pages, European Patent Office, Munich, Germany.

*Primary Examiner* — Rodney B White
(74) *Attorney, Agent, or Firm* — Marshall & Melhorn, LLC

(57) ABSTRACT

A back frame (28) for a seat back (18). The back frame (28) has side members (30) and cross members (32). The side members (30) have a dimension (40) which is larger than a corresponding dimension (42) of the crossmembers (32). The dimensions (40) and (42) being taken along the same direction. The crossmember (32) is inserted into a partial opening (34) in the side member (30). Since the dimension (42) is less than the dimension (40), the partial opening (34) does not extend across the entire dimension (42). Instead the
(Continued)

opening (34) only partially extends across the dimension (40) to a length substantially equal to dimension (42). The partial opening (34) is arranged against one side of the side member (30), so that the cross member (32) is positioned closer to that side. Sleeve nuts (36) are arranged in the side members (30), and are used to attach a recliner (54) which then attaches to the seat base (16).

11 Claims, 8 Drawing Sheets

(51) Int. Cl.
    *B60N 2/68*     (2006.01)
    *B60N 2/28*     (2006.01)

(58) Field of Classification Search
    USPC .................................... 297/452.2, 452.18
    See application file for complete search history.

(56) References Cited

U.S. PATENT DOCUMENTS

| | | | |
|---|---|---|---|
| 5,253,923 A | 10/1993 | Gootee | |
| 5,575,533 A * | 11/1996 | Glance | B60N 2/682 |
| | | | 297/452.2 X |
| 5,676,423 A * | 10/1997 | Pedronno | B60N 2/686 |
| | | | 297/452.2 X |
| 5,685,614 A * | 11/1997 | Chabanne | B60N 2/682 |
| | | | 297/452.2 |
| 5,711,577 A * | 1/1998 | Whalen | B60N 2/688 |
| | | | 297/452.2 X |
| 5,716,100 A | 2/1998 | Lang | |
| 5,722,731 A * | 3/1998 | Chang | B60N 2/0705 |
| | | | 297/452.2 X |
| 6,761,412 B1 * | 7/2004 | Garnweidner | B60N 2/68 |
| | | | 297/452.18 |
| 7,673,944 B2 * | 3/2010 | Behrens | B60N 2/68 |
| | | | 297/452.18 |
| 8,434,826 B2 * | 5/2013 | Zynda | B29C 44/18 |
| | | | 297/452.2 X |
| 8,657,382 B2 * | 2/2014 | Eckenroth | B60N 2/686 |
| | | | 297/452.2 X |
| 8,814,273 B2 * | 8/2014 | Zekavica | B60N 2/68 |
| | | | 297/452.2 X |
| 9,308,848 B2 * | 4/2016 | Nasshan | B60N 2/682 |
| 2006/0175887 A1 * | 8/2006 | Behrens | B60N 2/68 |
| | | | 297/452.18 |
| 2011/0156461 A1 | 6/2011 | Seibold et al. | |
| 2011/0278900 A1 | 11/2011 | Zekavica et al. | |

FOREIGN PATENT DOCUMENTS

| | | |
|---|---|---|
| JP | 2001017263 A | 1/2001 |
| JP | 2015101286 A | 6/2015 |
| WO | 0192051 A1 | 12/2001 |
| WO | 2010088384 A1 | 8/2010 |

* cited by examiner

SEAT BACK FRAME

CROSS REFERENCE TO RELATED APPLICATIONS

This application is a United States National Phase Application of International Application PCT/US2017/016170, filed Feb. 2, 2017, which claims the benefit of priority of U.S. Provisional Application 62/294,494, filed Feb. 12, 2016, the entire contents of which are incorporated herein by reference.

FIELD OF THE INVENTION

The present invention relates to a seat back, and in particular to a seat back for a vehicle which has rigid portions for support, and cushioning for comfort.

BACKGROUND OF THE INVENTION

A seat has a seat base or cushion, and often a seat back. The seat back allows a user to lean back, and the seat back supports the user's back as the user leans back. The seat back therefore needs rigidity to resist the force of the user leaning back. It is often desirable for the seat back to have cushioning in order to provide comfort to the user.

When producing a seat back, a back frame of rigid materials is often provided to provide the support for the user. When choosing a frame, strength is a significant consideration. The materials of the frame must be chosen and arranged so that the seat back can properly support the user. Cost is often a significant consideration, both in the cost of the raw materials, and in the cost of assembly. When the seat back is for the seat of a vehicle, the size and weight of the seat back are also often a significant consideration. It is often desirable to have the size of the frame be as small as possible to provide more space in the vehicle for other purposes/features. It is also often desirable to have the weight of the frame be as low as possible in order to make the performance of the vehicle better. Strength, material cost, size, ease of assemble and weight often are in conflict because optimizing one of these will cause one or more of the others to be non-optimal. Therefore, it is beneficial to provide a back frame which is beneficial in as many areas as possible, without having significantly poor characteristics in any one or more areas.

A typical rear seat back frame construction is shown in FIGS. 3-5. In the prior art embodiment of FIG. 5, the axial ends of right and left side member tubes 14 are connect to respective axial ends of upper and lower cross-member tubes 20 by respective external corner brackets 24. In the prior art embodiment of FIGS. 3-4, the axial ends of right and left side-member tubes 14 are interlocked into an opening 22 at each axial end of upper and lower cross member tubes 20 with all cross member tubes 20 and right and left side member tubes 14 being of the same dimensions. The typical back frame includes added recliner attachment brackets 26, to attach recliner upper plates to the back frame.

SUMMARY OF THE INVENTION

In view of growing environmental concerns, efforts have been made to produce lightweight seat structures for vehicles to increase fuel mileage, without the seat losing structural integrity and crash resistance. The present invention provides a seat back frame, preferably for the rear seat of a vehicle, where the seat back frame has interlocking rectangular shaped straight tubes forming side tubes and crossmember/cross member/cross-member tubes. Recliners are directly mounted to the side member tubes. The recliners are devices which allow the seat back to pivot into a plurality of positions with respect to the seat base/cushion. The seat back frame of the present invention allows the use of rectangular shaped straight tubes with reduced material thickness compared with prior art seat back frames. The material thickness of the tubes of the present invention preferably uses 0.8 mm thick rectangular tubes combined with the increased strength of Advanced High Strength Steel (AHSS) materials. The side-member and cross-member tubes interlock, without any external brackets. This is made possible by the side member tubes defining partial cutouts at ends of the tubes. The crossmember tubes include upper and lower crossmember tubes. The upper and lower crossmember tubes can be made smaller in size, especially in at least one transverse direction, such as width or depth, in order to reduce weight. These smaller sized upper and lower crossmember tubes are inserted into the side-member tubes, via the partial cutout in the ends of the side member tubes. Since the crossmember tubes are smaller in size, a full cut out of the side member tube in the depth direction is not needed. Since the side member tubes have a partial cutout, more strength is retained and the number of welds is reduced.

The seat back frame is further lightened by connecting the recliners directly to the side member tubes, preferably by bolting, without any additional brackets being needed or used. Using the partial cutout enabled the recliner to be directly mounted to side member tubes, by allowing an appropriate size of the side member tube for the set back frame requirements. The partial cutouts that enabled the crossmember tubes to be smaller in size. Recliner bolting is further enabled by a hollow single piece weld nut/inner sleeve, which is welded to the inner side of each side-member tube.

The recliner of the invention can be bolted directly to side member tubes, without any additional brackets by a hollow single piece weld nut/inner sleeve, which is welded to the inner side of each side-member. The recliner can also be welded directly to side member tubes, without any additional brackets because the side member can be appropriately sized for direct welding without the size of the side member interfering with the attachment of the cross members.

If the recliner is bolted to the side member, the hollow single piece weld nut/inner sleeve is attached to the inner side wall of the side member through fastening openings in the inner side wall of the side member. Bolts go through the recliner and an outer side wall of the side member, until the bolts encounter the nut on the inner side wall of the side-member, for thread engagement. An inner shoulder/sleeve of the single piece weld nut/inner sleeve acts as a spacer, on the inside of the side-member and contacts the inner side of the outer side wall of the side member. This prevents a collapse of the side member walls, during the recliner bolting process and thus a potential soft joint.

The seat back frame of the present invention can be sized as described above, and with the materials described above, and still meet all typical rear seat critical performance requirements, while having advantages in that the mass/weight is less than a typical design for the same content and performance requirements, having less parts in the back frame assembly than a typical design resulting in less piece cost and tooling, and requiring less welds and less overall total weld length, also resulting in less piece cost and tooling.

The side member tubes have an axial direction, axial ends, a front side, a rear side, a first lateral side and a second lateral side. All of the sides of the side member tube extend in the axial direction of the side member tube. The side member tube has a dimension extending from the rear side to the front side of the side member tube. Cross member tubes connect the side member tubes, preferably at the ends of the side member tubes. The crossmember tubes have an axial direction, axial ends, a front side, a rear side, a top side and a bottom side. All of the sides of the cross member tube extend in the axial direction of the cross member tube. The labeling of the sides is relative, and can be interchanged depending on the orientation of the final seat back frame. The cross member tubes have a dimension extending from the rear side to the front side of the side member tube. This dimension of the crossmember tube is less than the corresponding rear side to front side dimension of the side member tube. The ends of the cross member tubes are arranged in the axial ends of the side member tubes. The rear side of at least one of the crossmember tubes is closer to the rear side of a connected side member tube than the front side of the crossmember tube is to the front side of the connected side member tube.

The axial ends of the side member tube define upper and lower openings in the first lateral side, preferably at the upper and lower axial ends respectively. The axial ends of the crossmember tubes are arranged in the openings in the first lateral side of the side member tube. The openings in the first lateral side have edges formed by the first lateral side. These edges are welded to the sides of the crossmember tubes. In particular, the edges of the first lateral side of the side member tube for the upper opening are welded to the front and bottom side of the upper crossmember tube. The edges of the first lateral side of the side member tube for the lower opening are welded to the front and top side of the bottom crossmember tube. Also the openings in the first lateral side have edges formed by the rear side of the side member tube, with the edge formed by the rear side of the side member tube being welded to the rear side of the respective cross member tubes.

A recliner is attached to the lower axial end, or lower axial end area, of the side member tube, where the recliner pivotally adjusts a position of the side member tube and the crossmember tube with respect to a seat base. A nut/sleeve arrangement connects the recliner to the side member tube. The nut has a sleeve portion with an outer diameter, internal threads, and a flange having an outer diameter, the outer diameter of the flange being larger than the outer diameter of the sleeve portion. The side member defines a fastener opening in the wall of the first lateral side. The fastener opening in the first lateral side being larger than the outer diameter of the sleeve portion. The fastener opening in the first lateral side being smaller than the outer diameter of the flange. The side member also defines another fastener opening in the second lateral side. The another faster opening in the second lateral side being smaller than the outer diameter of the sleeve.

The nut is arranged with the sleeve portion in the fastener opening and inside the side member tube. An end of the sleeve portion is arranged against an inner side of the second lateral side of the side member tube. The nut/sleeve arrangement is arranged with the flange against an outer side of the first lateral side of the side member tube. The bolt is arranged to pass through the recliner and the another fastener opening in the second lateral side of the side member tube. The bolt has external threads engaging with the internal threads of the nut to connect the recliner to the side member tube.

The axial direction of the side member tubes and the axial direction of the crossmember tubes are arranged in a back frame plane. Each side member tube has the front and back dimension in a direction perpendicular to the back frame plane. Each cross member tube also has the front and back dimension in a direction perpendicular to the back frame plane. This front and back dimension of the crossmember tubes being smaller than the front and back dimension of the side member tubes. The first and second, or right and left, side members are arranged spaced apart in the back frame plane, as well as the upper and lower cross member tubes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
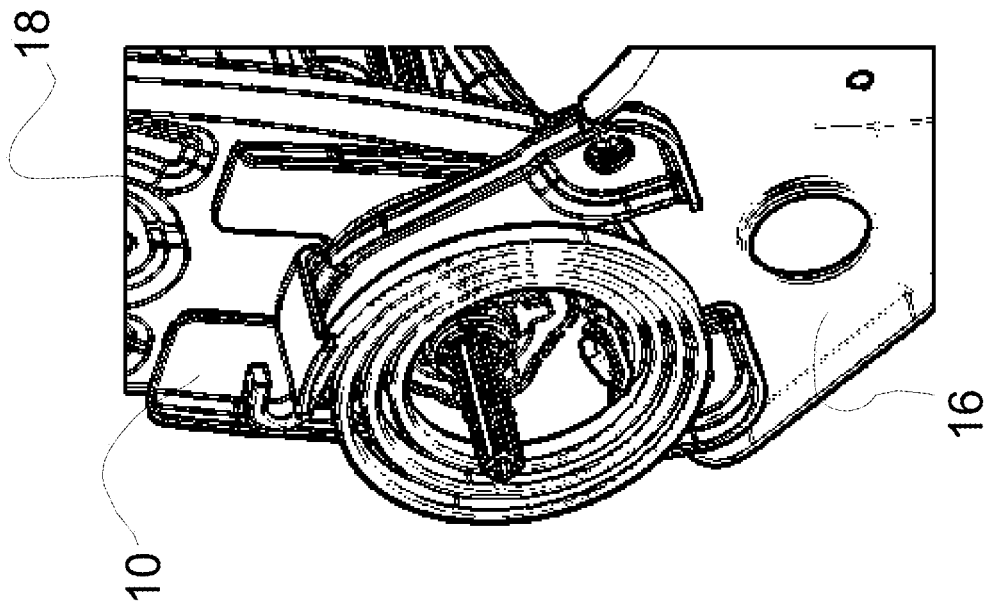
FIG. 2 is a view of the connection between the seat back and the seat base.
Figure 1:
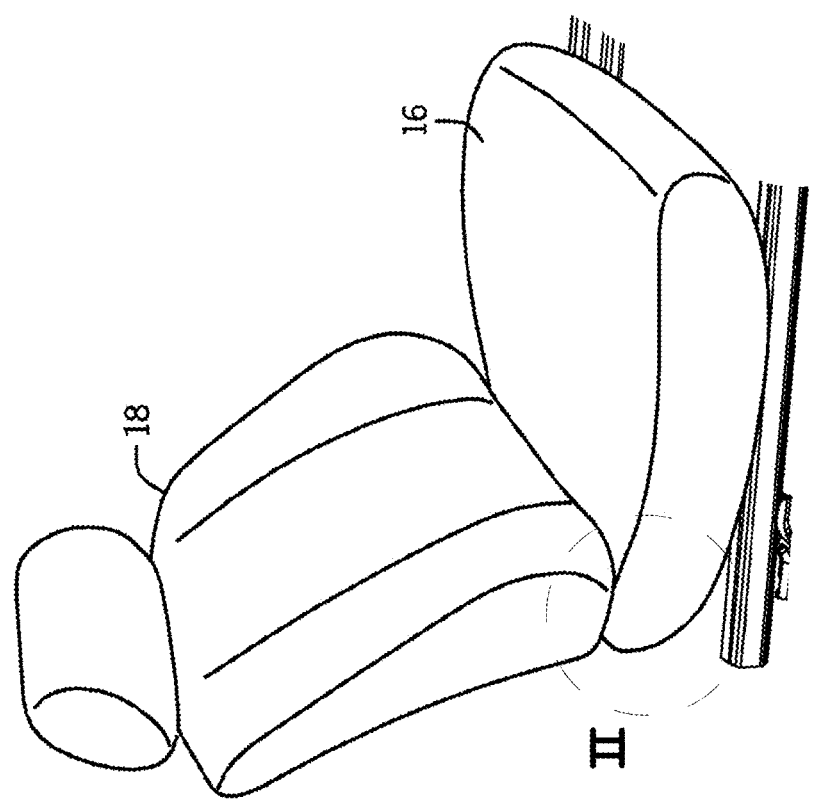
FIG. 1 is a perspective view of a seat with a seat back.

Referring to the drawings in particular, FIG. 1 shows a seat with a seat base or seat cushion 16 and a seat back 18. The seat back 18 is pivotally connected to the seat base 16 by a recliner 10 in the area shown by II in FIG. 1. FIG. 2 showing a partially disassembled view of an example of how the seat back 18 can be pivotally connected to the seat base 16. Other existing recliners are possible with various brackets, pins and pivot points.

Figure 3:
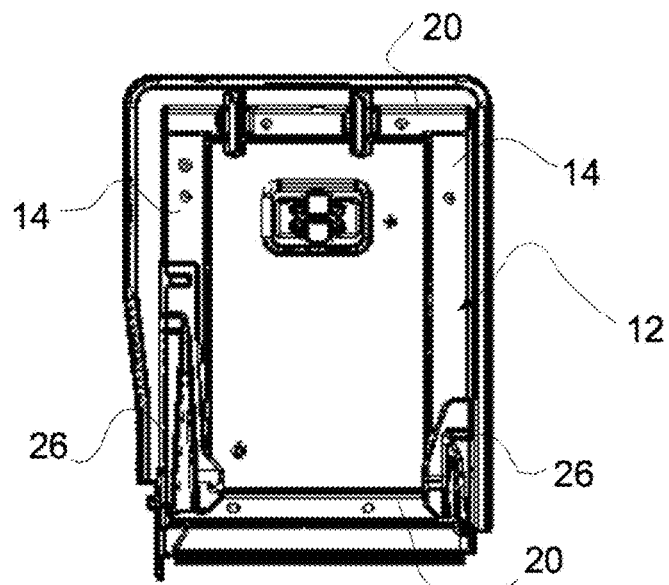
FIG. 3 is a view of a prior art seat back showing the seat frame.
Figure 4:
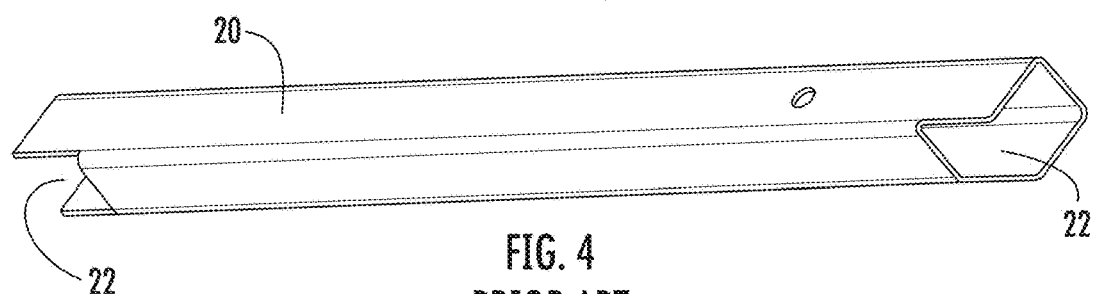
FIG. 4 is a view of a crosspiece of the prior art seat back of FIG. 3.
Figure 5:
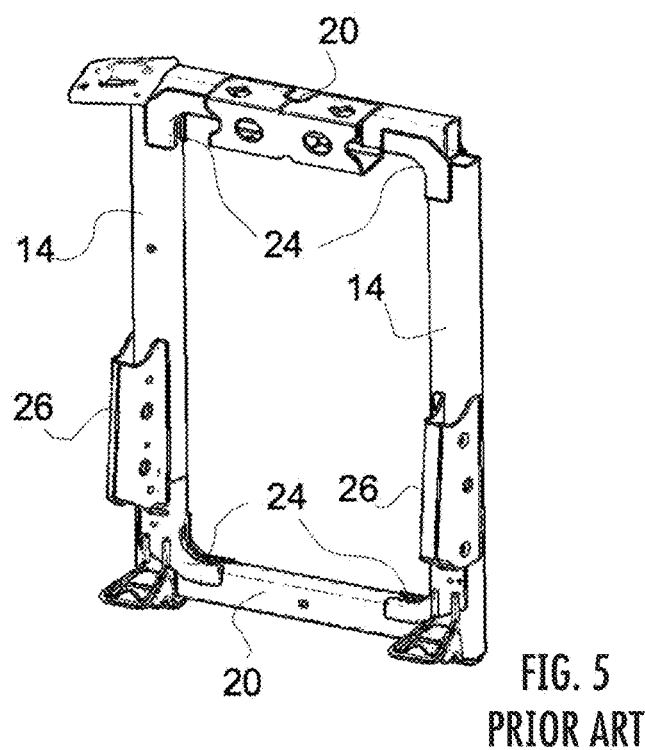
FIG. 5 is a perspective view of another prior art seat back frame.

The seats have a back frame in the seat back 18. FIGS. 3-5 show a prior art back frame 12, with a prior art side member 14 and a prior art crossmember 20. The prior art back frame 12 connects to a recliner, such as 10 through prior art recliner brackets 26 which are attached to the prior art side members 14. The prior art side members 14 and crossmembers 20 each have the same dimensions, especially in a direction normal to the plane of the back frame 12, which is typically the front to back direction of the seat. In one embodiment, such as in FIGS. 3 and 4, side members 14 insert into openings 22 at each axial end of the upper and lower crossmembers 20. In the embodiment of FIG. 5, the side members 14 are attached to the crossmembers 20 by corner brackets 24. The prior art back frames of FIGS. 3 and 4 have been found to be very labor intensive and thus costly to manufacture.

Figure 6:
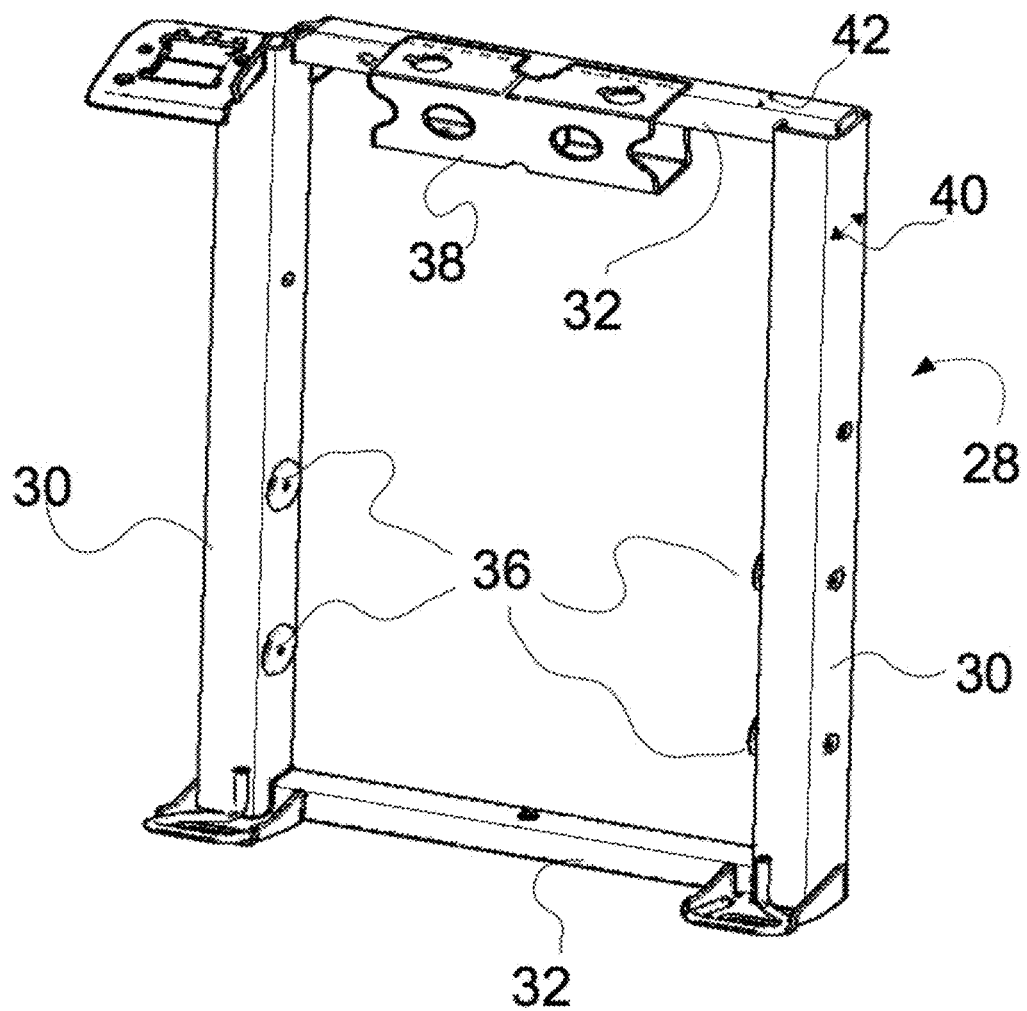
FIG. 6 is a perspective view of the seat back frame of the present invention.
Figure 7:
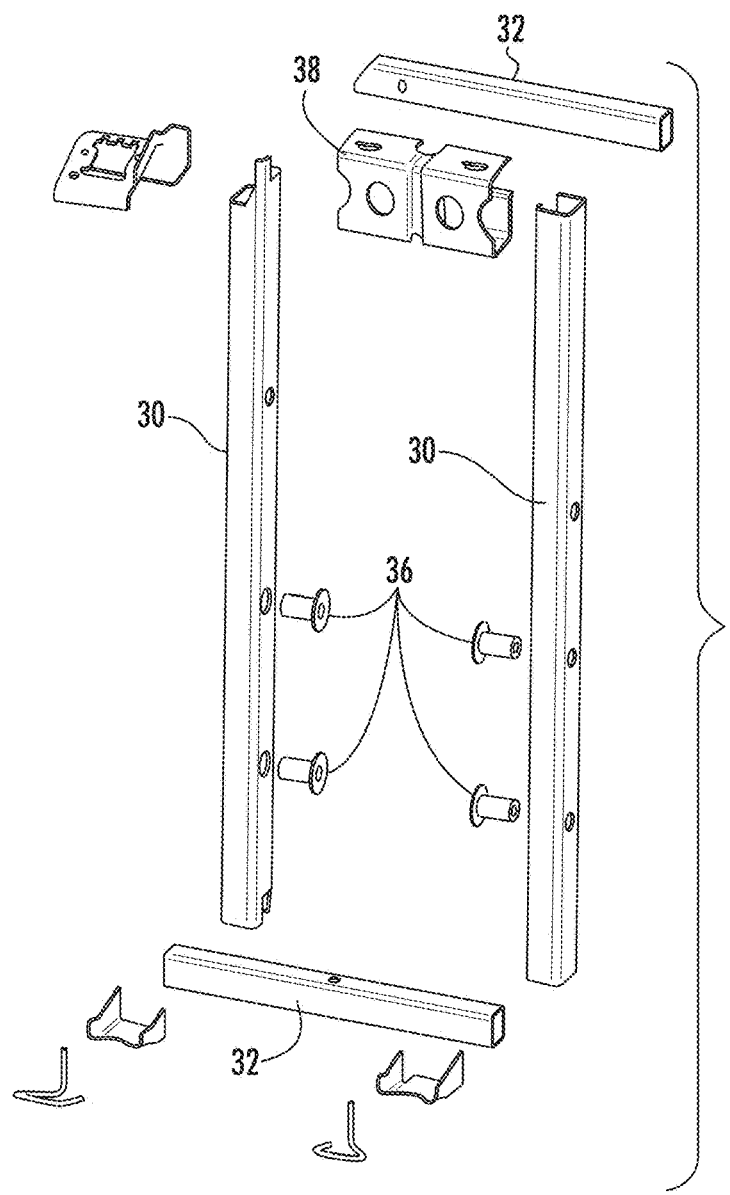
FIG. 7 is an exploded view of the seat back frame of the present invention.
Figure 8:
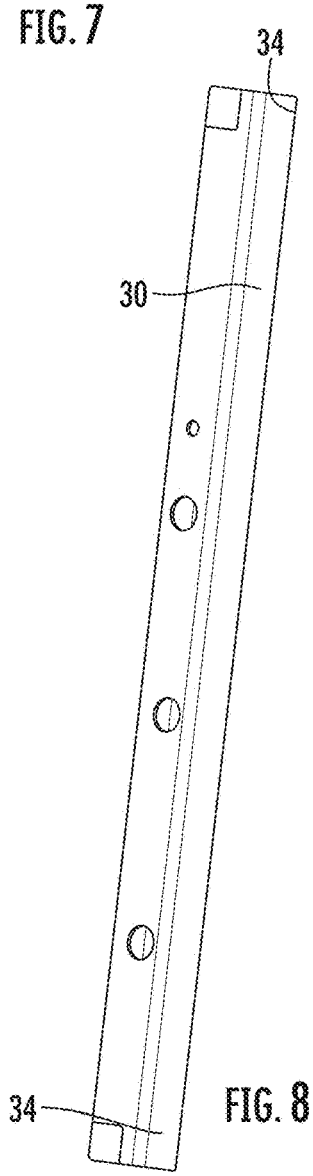
FIG. 8 is a view of a side member of the seat back frame of FIG. 6.

The present invention as shown in FIG. 6 onward, has a back frame 28 for a seat back 18. The back frame 28 has side members 30 and cross members 32. The side members 30 have a dimension 40, usually called the front to back dimension, which is larger than a corresponding dimension 42, also usually called the front to back dimension, of the crossmembers 32. The dimensions 40 and 42 being taken along the same direction. The crossmember 32 is inserted into a partial opening 34 in the side member 30. Since the dimension 42 is less than the dimension 40, the partial opening 34 does not extend across the entire dimension 42. Instead the opening 34 only partially extends across the dimension 40 to a length substantially equal to dimension 42 with variations for normal manufacturing tolerances and to allow the interlocking of the parts. The partial opening 34 is arranged against, or extends all the way to, one side of the side member 30, so that the cross member 32 is positioned closer to that one side when the crossmember 32 is arranged in a partial opening 34. One advantage of this placement of the crossmember 32 in the partial opening 34 is that it allows the head restraint attachment bracket 38 to be positioned more optimally for a head rest, not shown. The sleeve nuts 36 are also arranged in the side members 30, and are used to attach a recliner which then attaches to the seat base 16.

Figure 9:
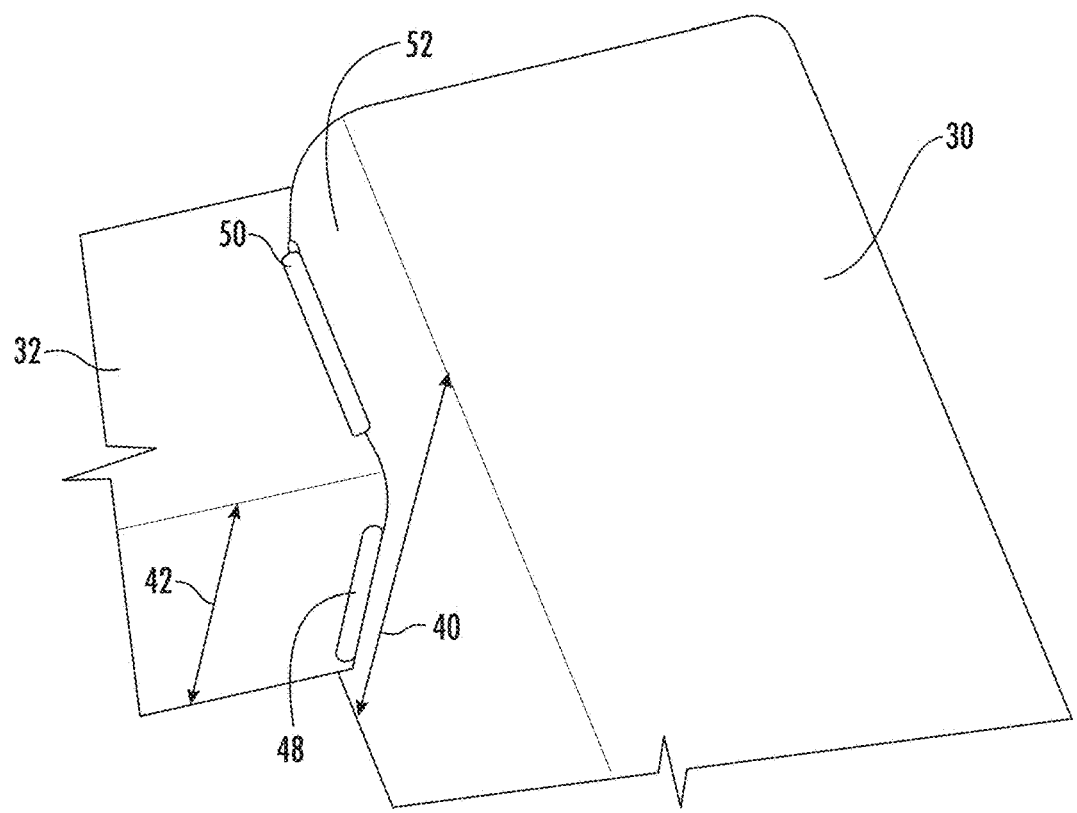
FIG. 9 is a view of one side of the joint between a side member and a crossmember.
Figure 10:
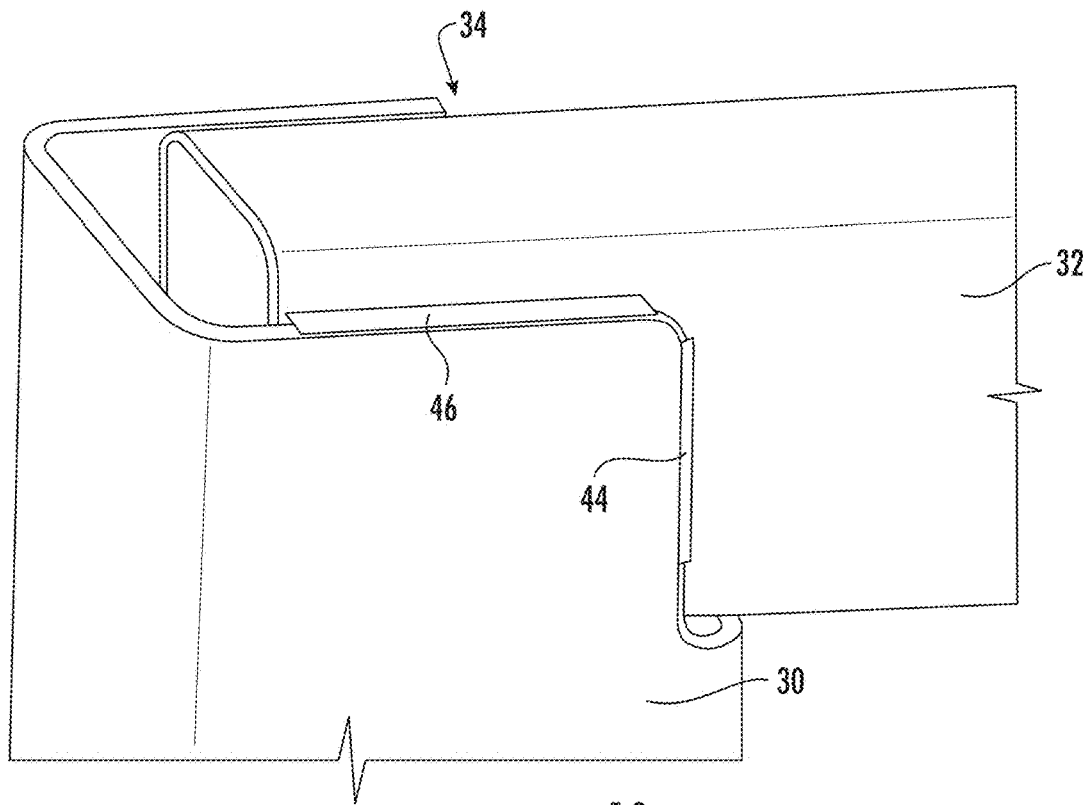
FIG. 10 is a view of another side of the joint between a side member and a crossmember.

FIGS. 9 and 10 show a close-up of the connection between the side member 30 and the crossmember 32. FIG. 9 is a view of the front (relative) side of the connection, and FIG. 10 is a view of the rear (relative) side of the connection. The crossmember 32 is positioned closer to the rear side of the side member 30, which causes the crossmember 32 to be spaced from the front side of the side member 30. The crossmember 32 and the side member 30 can be attached at the rear side by welds 44 and 46. The partial opening 34 does not extend across the entire dimension 40, which leaves a partial side 52 along the dimension 40. On the front side of the connection, as shown in FIG. 9, the crosspiece 32 is connected to the side piece 30 by welds 48 and 50.

The weld 50 is possible because of the partial side 52 which defines part of the partial opening 34. This partial side 52 provides another attachment point. This another attachment point, in addition to the material of partial side 52, especially in the front/back direction increases the strength of the connection. The partial opening 34 that extending all the way across dimension 40, and thus providing the partial side 52 allows crossmember 32 and side member 30 to be of different dimensions in the direction from front to rear.

Instead of the welds 44, 46, 48 and 50, other similar attachment structures can be used such as praising, soldering, or various adhesives.

The labeling of "front" and "rear" side is relative. In the preferred embodiment the crossmember 32 is arranged on the rear side so that the head restraint attachment bracket 38 is more optimally positioned. By having the crossmember 32 arranged more rearwardly, this allows a head restraint/rest which is attached to the head restraint attachment bracket to be larger without interfering with the normal position of the head of an occupant. The present invention can also have the "front" and "rear" sides reversed, or to have the crossmembers 32 arranged more forward with respect to the side members 30, depending on the most optimal positioning of the cross members 32.

Figure 11:
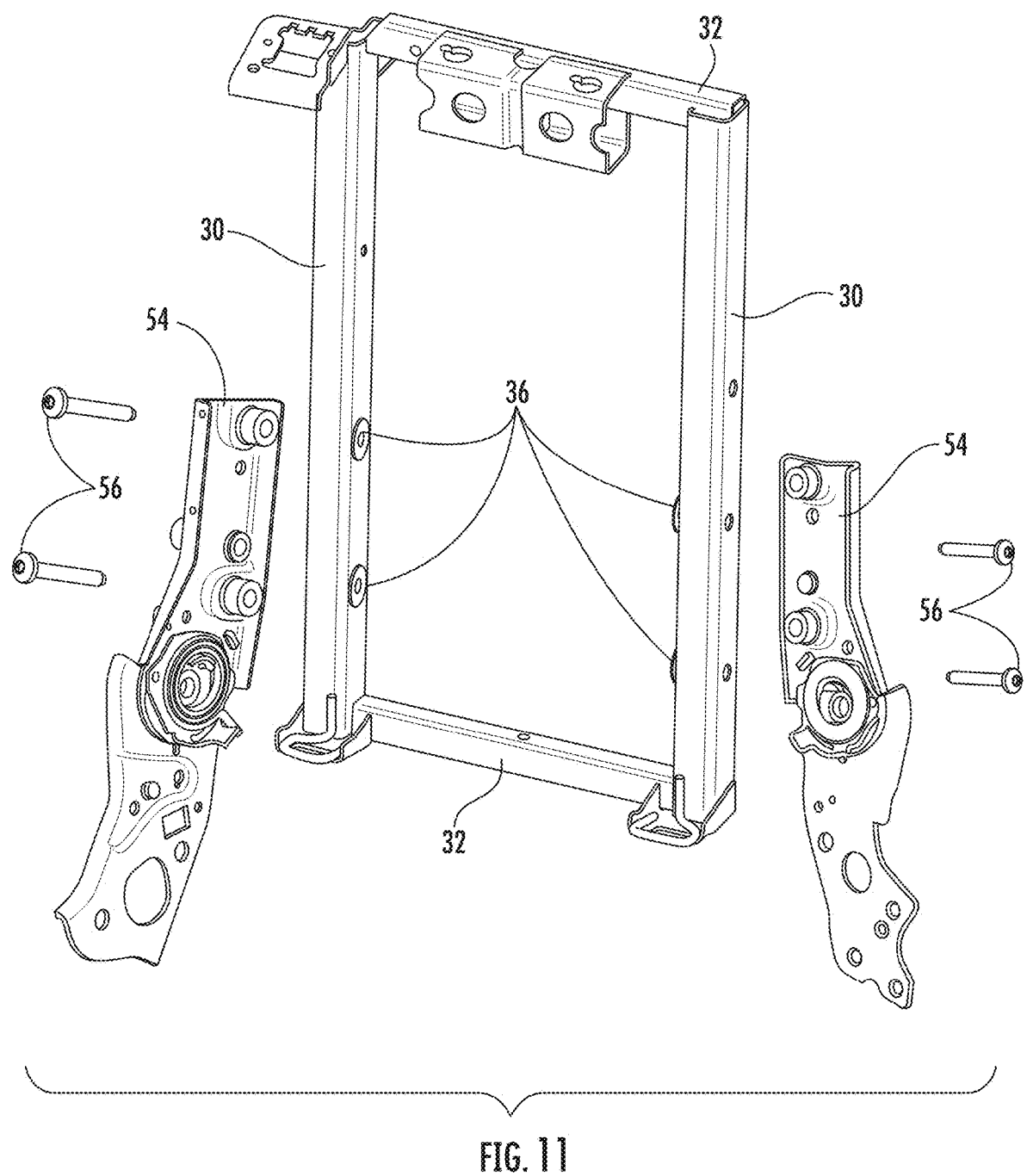
FIG. 11 is an exploded view of the connection between the seat back frame and the recliners.
Figure 12:
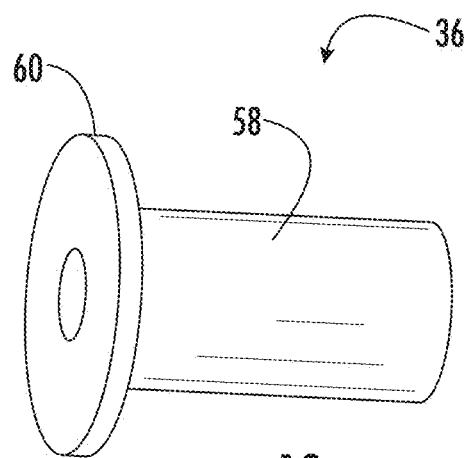
FIG. 12 is a perspective view of a sleeve nut.
Figure 13:
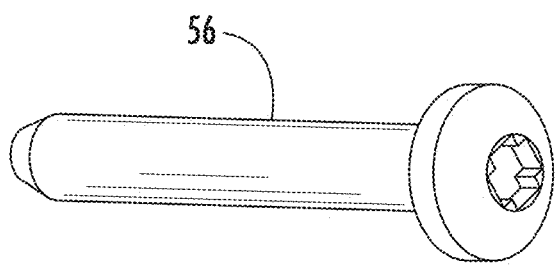
FIG. 13 is a perspective view of a bolt used to attach the recliner to the back frame.
Figure 14:
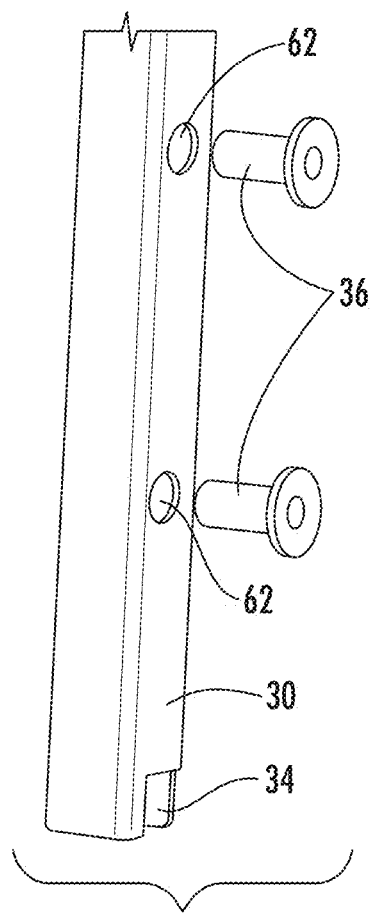
FIG. 14 is an exploded view of the sleeve nuts and a side member.
Figure 15:
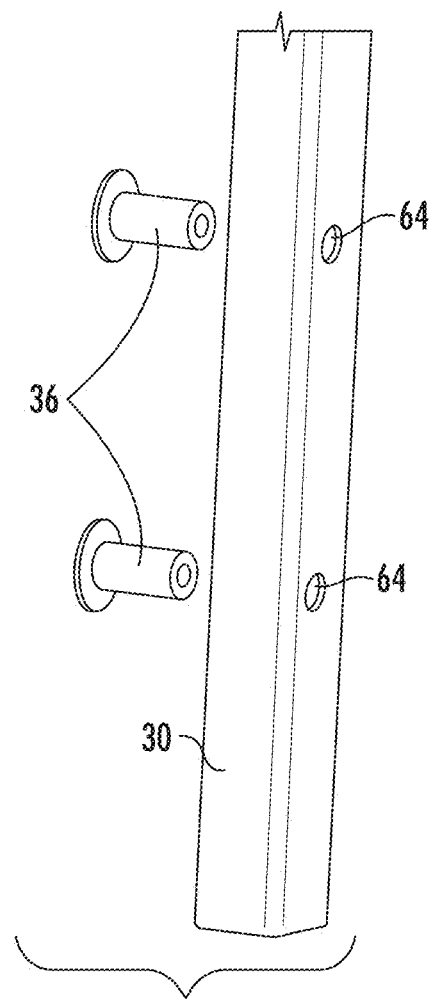
FIG. 15 is a another exploded view of the sleeve nuts and another side member.

In the embodiment of FIG. 11, recliners 54 are bolted to the side members 30 by bolts 56 and sleeve nuts 36. The size and strength of the side members 30, especially along dimension 40, and the dimensions of the recliners 54 are chosen so that the recliners 54 can be preferably bolted directly into sleeve nuts 36 arranged in the side members 30 without the need for additional brackets. As shown in FIG. 12, each of the sleeve nuts 36 have a sleeve portion 58 and a flange portion 60. Each sleeve portion 58 is arranged in a fastener opening 62 in a first lateral side, often considered the inner side, of a respective side member 30, as shown in FIG. 14. As shown in FIG. 15, each side member 30 defines another fastener opening 64 in the second lateral side, often considered the outer side.

The diameter of the fastener openings 62 is arranged to be larger than outer diameter of a corresponding sleeve 58, but only by an amount sufficient to allow the corresponding sleeve 58 to pass through the respective faster opening 62. Preferably the fastener opening 62 centers the corresponding sleeve 58 in the respective fastener opening 62. The outer diameter of the flange 60 is sized to be larger than the fastener opening 62. The overall size and shape of the flanges 60 are chosen to be large enough so that the recliners 54 can adequately support the backrest 18 and the occupant of the seat.

The another faster opening 64 in the second lateral side is sized to be smaller than the outer diameter of the sleeve portion 58, but large enough to allow a respective bolt 56 to pass through. An axial length of the sleeve portions 58 are sized so that the end of the sleeve portion 58 opposite the flange 60 abuts the inside of the second lateral side the side member 30 at the same time as a side of the flange 60 contacts an outside of the side member 30 on the first lateral side, within normal manufacturing tolerances.

The bolts 56 is arranged to pass through their respective recliner 54 and their respective another fastener opening 64 in the second lateral side of the side member 30. The inside of the sleeve nut 36 is preferably threaded, not shown, to engage with threads, not shown, of the respective bolts 56. In the alternative, a threaded nut could be arranged on the flange 60 on a side of the flange 60 diametrically opposite the sleeve 58.

Figure 16:
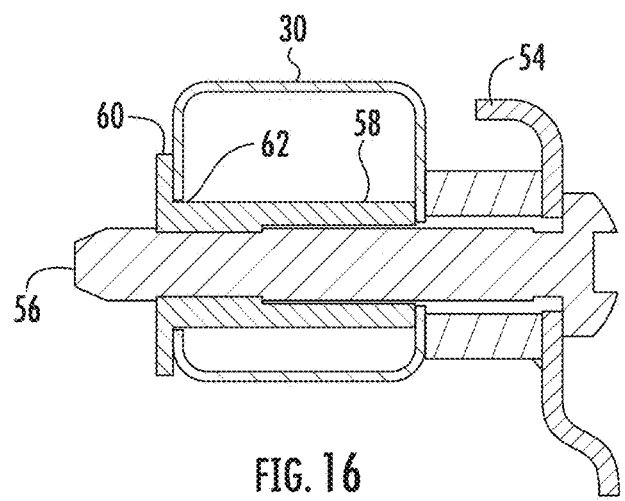
FIG. 16 is a cross sectional view through the nut and bolt attachment of the recliner to the seat frame.

The sizing of the nut sleeve 36 in the side member 30 allows the bolt 56 to tighten with the sleeve nut 36, and securely fasten the recliner 54 to the side member 30, as shown in FIG. 16, without crushing the side member 30. The side member 30 can then be sized appropriately for forces resulting from a user leaning against the seat back 18, and the recliner 54 connection.

The dimension 40 of side member 30 is preferably a constant size from one axial end of side member 30 to the other axial end. The dimension 40 is preferably chosen so that the recliner 54 can attach directly to the side member 30 without the need of additional brackets. This in combination with the offsetting of the crossmember 32 by means of the partial opening 34 allows a reduction in expense since there is no need for additional brackets either at the connection between the recliner 54 and side member 30, or between the side member 30 and the cross member 32. Furthermore, the constantly sized side member 30 is easier to manufacture thus reducing material costs.

Figure 17:
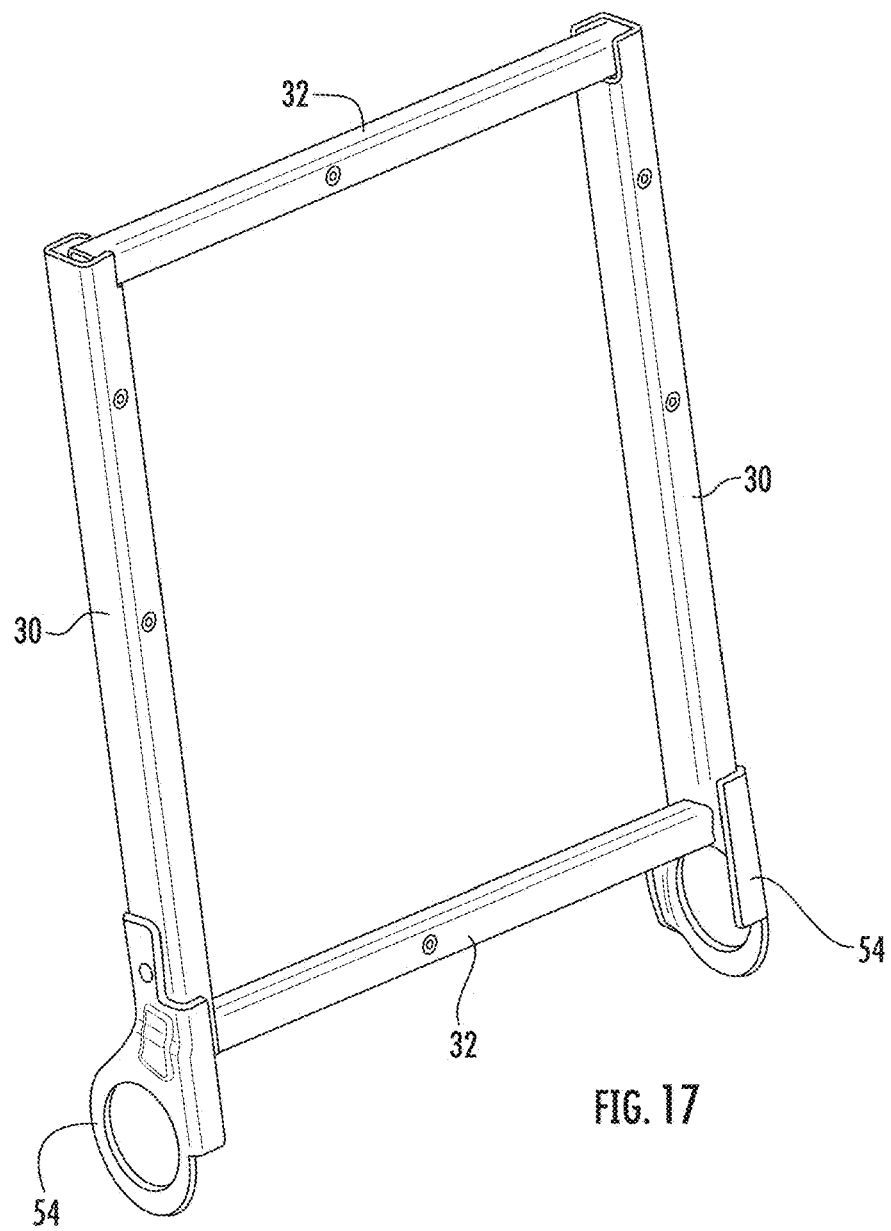
FIG. 17 is a view of the seat back frame welded to portions of the recliner.

In another embodiment, as shown in FIG. 17, instead of bolting the side members 30 to the recliners 54, the side members 30 can be sized so that it can be directly welded to a portion of the respective recliners 54 without the need of additional brackets, and still have the strength necessary to transmit forces between the side members 30 and the recliners 54 while supporting the occupant of the seat. The side members 30 can be sized to be optimal for this recliner connection, and even though this size may be larger than the corresponding dimension 42 of crossmembers 32, the size of the partial openings 34 compensate for this difference in dimensions, and allows the crossmembers 32 to be dimensioned appropriate for the forces experienced by the crossmembers 32.

While specific embodiments of the invention have been shown and described in detail to illustrate the application of the principles of the invention, it will be understood that the invention may be embodied otherwise without departing from such principles.

What is claimed is:

1. A seat back frame comprising:
    a side member tube having an axial direction and an axial end, said side member tube having a front side, a rear side, a first lateral side and a second lateral side, all of said sides of said side member tube extending in said axial direction of said side member tube, said side member tube having a dimension extending from said rear side to said front side of said side member tube;
    a cross member tube having an axial direction and an axial end, said cross member tube having a front side, a rear side, a top side and a bottom side, all of said sides of said cross member tube extending in said axial direction of said cross member tube;
    said cross member tube having a dimension extending from said rear side to said front side of said cross member tube, said dimension of said cross member tube being less than said dimension of said side member tube, said end of said cross member tube being arranged in said end of said side member tube, said rear side of said cross member tube being closer to said rear side of said side member tube than said front side of said cross member tube is to said front side of said side member tube.

2. A seat back frame in accordance with claim 1, wherein: said end of said side member tube defining an opening in said first lateral side, said end of said cross member tube being arranged in said opening in said first lateral side of said side member tube.

3. A seat back frame in accordance with claim 2, wherein: said opening in said first lateral side has edges formed by said first lateral side, said edges being welded to said sides of said cross member tube.

4. A seat back frame in accordance with claim 3, wherein: said edges of said first lateral side of said side member tube being welded to said front and bottom side of said cross member tube.

5. A seat back frame in accordance with claim 2, wherein: said opening in said first lateral side has an edge formed by said rear side of said side member tube, said edge formed by said rear side of said side member tube being welded to said rear side of said cross member tube.

6. A seat back frame in accordance with claim 1, wherein: said cross member tube has a second end;
    a second side member tube has an end connected to said second end of said cross member tube, said rear side of said cross member tube being closer to a rear side of said second side member tube then said front side of said cross member tube is to a front side of said second side member tube.

7. A seat back frame in accordance with claim 1, wherein: said side member tube has a second end;
    a recliner is attached to said second end of said side member tube, said recliner pivotally adjusting a position of said side member tube and said cross member tube with respect to a seat base;
    a nut connecting said recliner to said side member tube, said nut having a sleeve portion with an outer diameter, internal threads, and a flange having an outer diameter, said outer diameter of said flange being larger than said outer diameter of said sleeve portion;
    said side member defining a fastener opening in said first lateral side, said fastener opening in said first lateral side being larger than said outer diameter of said sleeve portion, said fastener opening in said first lateral side being smaller than said outer diameter of said flange;
    said side member defining a second fastener opening in said second lateral side, said second faster opening in said second lateral side being smaller than said outer diameter of said sleeve.

8. A seat back frame in accordance with claim 7, wherein: said nut is arranged with said sleeve portion in said fastener opening and inside said side member tube, an end of said sleeve portion being arranged against an inner side of said second lateral side of said side member tube; said nut is arranged with said flange against an outer side of said first lateral side of said side member tube.

9. A seat back frame in accordance with claim 8, wherein: a bolt is arranged to pass through said recliner and said second fastener opening in said second lateral side of said side member tube, said bolt having external threads engaging with said internal threads of said nut to connect said recliner to said side member tube.

10. A seat back frame in accordance with claim 1, wherein: said side member tube has a second end; a recliner is attached to said second end of said side member tube, said recliner pivotally adjusting a position of said side member tube and said cross member tube with respect to a seat base; said dimension of said side member is substantially constant from said recliner to said end.

11. A seat back frame comprising:
    a side member tube having an axial direction and an axial end, said side member tube having a front side, a rear side, a first lateral side and a second lateral side, all of said sides of said side member tube extending in said axial direction of said side member tube, said side member tube having a dimension extending from said rear side to said front side of said side member tube;
    a cross member tube having an axial direction and an axial end, said cross member tube having a front side, a rear side, a top side and a bottom side, all of said sides of said cross member tube extending in said axial direction of said cross member tube;
    said cross member tube having a dimension extending from said rear side to said front side of said cross member tube, said dimension of said cross member tube being less than said dimension of said side member tube, said end of said cross member tube being arranged in said end of said side member tube, said rear side of said cross member tube being closer to said rear side of said side member tube than said front side of said cross member tube is to said front side of said side member tube wherein said end of said side member tube defining an opening in said first lateral side, said end of said cross member tube being arranged in said opening in said first lateral side of said side member tube;

said opening in said first lateral side has an edge formed by said rear side of said side member tube, said edge formed by said rear side of said side member tube being welded to said rear side of said cross member tube.

* * * * *